Jan. 26, 1971   A. G. KURISU   3,559,142
ENVIRONMENT CONTROL SWITCH
Original Filed Oct. 5, 1967   2 Sheets-Sheet 1
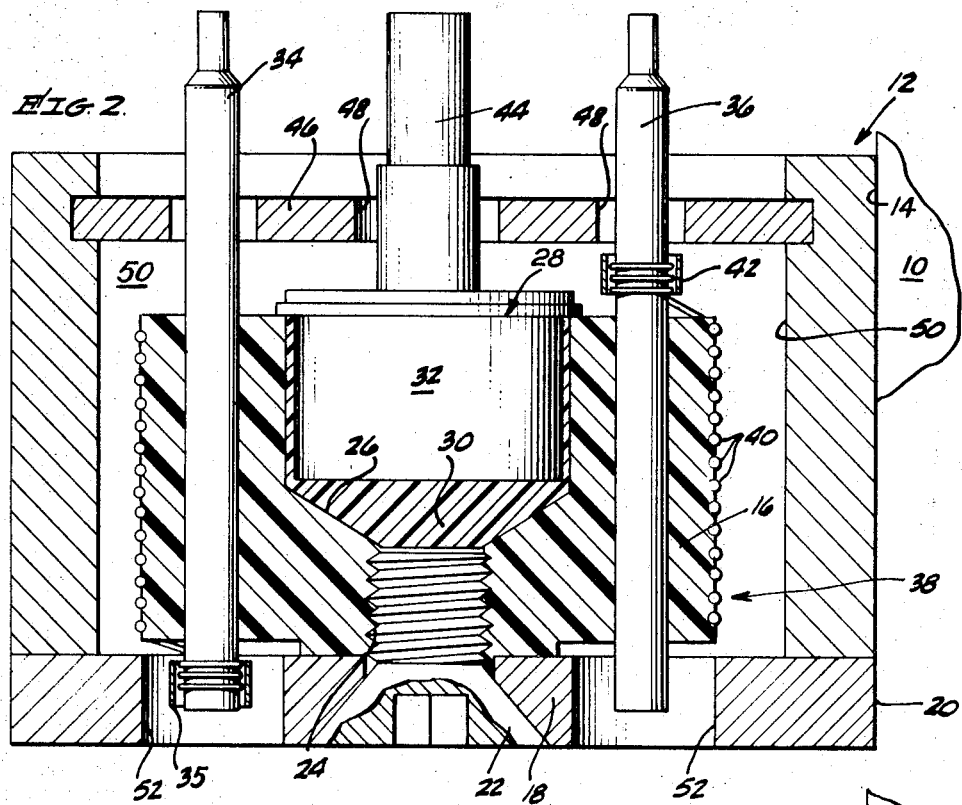
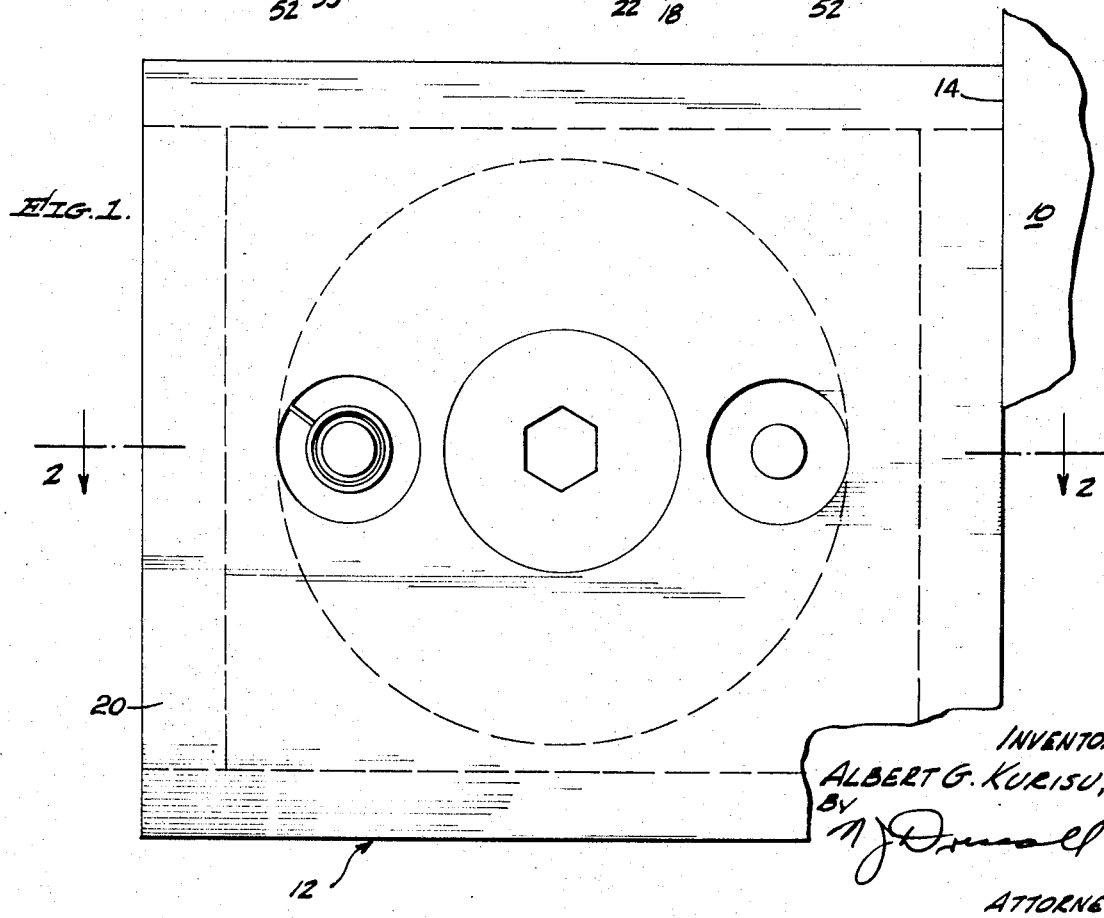
INVENTOR
ALBERT G. KURISU,
BY
ATTORNEY United States Patent Office 3,559,142
Patented Jan. 26, 1971

3,559,142
ENVIRONMENT CONTROL SWITCH
Albert G. Kurisu, Anaheim, Calif., assignor to Hughes Aircraft Company, Culver City, Calif., a corporation of Delaware
Continuation of application Ser. No. 673,183, Oct. 5, 1967. This application Dec. 4, 1969, Ser. No. 878,964
Int. Cl. H01h 37/04
U.S. Cl. 337—380                                                  2 Claims

ABSTRACT OF THE DISCLOSURE

An environment control switch comprising a block of dielectric material having an electrical heating element intimately wound around the surface of the block and a temperature-sensing member embedded in the block. This combination comprises a heat-applying resistor. Appropriate electrical leads are provided to convey power to the heating element. The temperature-sensing element may be a thermostat designed to open a control circuit in response to a sensed temperature condition. By the application of electric power to the heating element a fixed amount of heat energy is applied to the block. As the environment temperature condition departs from a determined control point, the heat energy is no longer dissipated to environment at the normal rate and heats the block to cause the thermostat to open. Thus, the switch provides effective environment control.

---

This is a continuation of application Ser. No. 673,183, now abandoned.

The invention relates to an environment control device and particularly to a switching unit which utilizes heat transfer to effect environment control.

Certain operating systems require that devices be held at a relatively constant temperature to effect efficient system operation. An example of such a system is described in my copending patent application Ser. No. 598,850, now Pat. No. 3,404,730 filed Dec. 2, 1966, for a "Temperature Control Arrangement." Briefly, that application discloses a chamber having a klystron heat load disposed therein. The klystron is immersed in liquid Freon 113 within the chamber and is cooled in response to the vaporization of the Freon receiving heat from the operating klystron. To avoid system damage, it is desirable to continuously monitor the temperature condition within the chamber and provide a mode of system shutdown in the event that the temperature rises above a predetermined level. Also it is desirable to provide system shutdown in the event the liquid level within the chamber falls too low.

Conventionally, when parameters such as these were required to be observed in a system, a float-type switch was provided which would shut down the system in the event the liquid fell below a predetermined level. Additionally, an independent thermostat device was provided to constantly monitor the temperature level within the chamber and initiate shutdown in the event said temperature rose above said determined level. The requirement for independent units to control both temperature and liquid level is obviously expensive. Float-type switches are sensitive to attitude which restricts the movability of the chamber. In addition, float-type switches frequently require installation in prime chamber location which may interfere with equipment location in the chamber or adversely affect chamber size. Also, some prior art controls are sensitive to local magnetic fields which interfere with operation.

It is a primary object of the invention to provide a unitary switching arrangement offering the multiple function of sensing both variations in liquid level variations in temperature.

It is a further object of the invention to provide a switching device of the type described that is physically small, easily installed and maintained, and may be embodied at low initial cost.

It is still a further object of the invention to provide a switching device of the type described that is insensitive to attitude change and will operate in the functional environment noted without employing moving parts.

Specifically, the switching structure provided comprises a block of dielectric material having an electrical heat element applied to the surface thereof. A temperature-sensing device has its sensitive tip embedded in this block of dielectric material. Electrical leads are provided to pass a current through the electrical heat, element to apply heat uniformly to the surface of the dielectric block. In normal condition, that is, when the temperature condition of switch environment is at a desired range, most of the heat applied to the dielectric material is dissipated to the environment within a predetermined temperature level of the switch and the temperature-sensing device does not operate. In the event the liquid level falls below a determined point, the heat being applied to the block is no longer rapidly absorbed by the environment and penetrates the block to activate the temperature-sensing device. Alternately, if the liquid level of the environment remains at the desired set point but the temperature of the liquid environment rises due to, for example, a change in external temperature, the rate that heat is absorbed by the environment at the higher temperature level is decreased with the result that heat developed by the electrical heat element flows into the block and energizes the temperature-sensing device.

These and other features and advantages of the invention will become apparent in the course of the following description and from an examination of the related drawings, wherein:

FIG. 1 is an end-elevational view of the devices here under consideration;

FIG. 2 is a sectional view taken along line 2—2 of FIG. 1 illustrating in detail the structure of the device;

Figure 4:
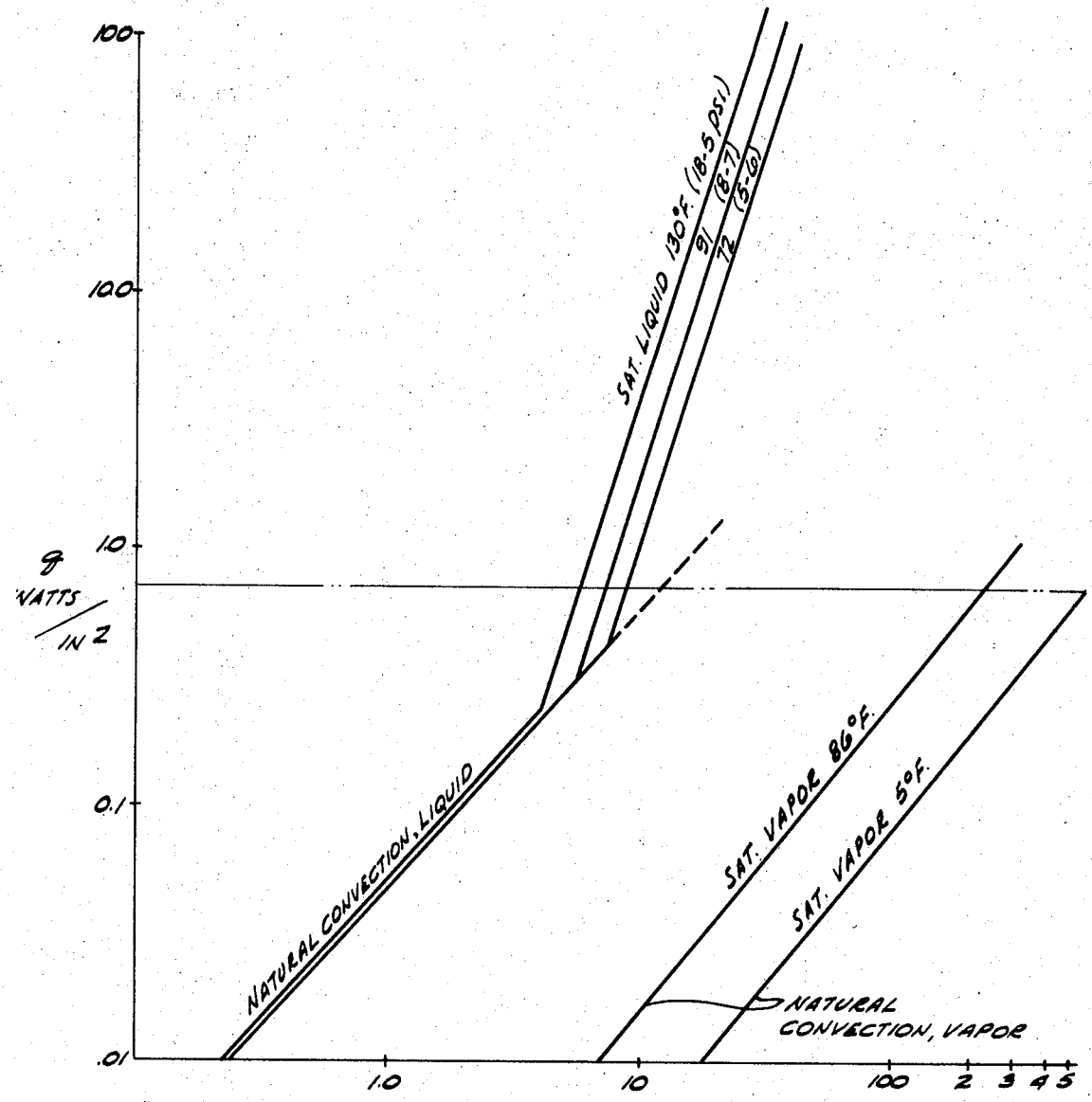
FIG. 4 is a graph illustrating the heat transfer rate for the modes of operation for the device here under consideration.

Describing the invention in detail and directing attention to FIGS. 1 and 2, the phantom numeral 10 indicates a wall of a liquid chamber such as is disclosed in the referenced application. Indicated generally at 12 is the switching unit which is the primary novel structure herein disclosed. The switch 12 may be secured in any convenient manner as by a bond 14 to the wall 10 and should be physically located at the liquid control level of the chamber as will hereinafter be discussed in detail.

Internally, the switch 12 comprises a dielectric body 16. The body 16 is secured to the inner wall of one wall 18 of the housing 20 as, for example, by the screw 22 being threadably received in tapped hole 24 of the body 16. The body 16 is provided with a centrally located cavity 26. A temperature-sensing device or sensor, 28 is deposited within cavity 26 and may be secured therein, for example, by bonding with an appropriate epoxy resin, as 30, to provide intimate thermal contact between the sensor and body 16. In one embodiment of the invention, the temperature-sensing device 28 may be a conventional thermostat the sensitive tip 32 of which is embedded in the body 16.

The body 16 additionally receives a first and second solder terminal 34 and 36, respectively. The solder terminal 34 is provided with a crimp-type clipping element 35 at one end to secure thereto one end of a wire heating element 38. The element is surface wound as at 40, 40 around the periphery of the block 16 and the opposed end of the wire heating element 38 is crimp-clipped as at 42 to the second solder terminal 36. It will thus be apparent that electric current may be applied to the heating element 38 via terminals 34 and 36. Additionally, a conduit 44 may be connected to the thermostat 28 to carry appropriate electrical leads or other signal transmitting structure.

The housing 20 is provided with a faceplate 46 on one side thereof, said faceplate being perforated, that is, being provided with a plurality of openings as at 48, 48, to accommodate the ingress and egress of fluid into the body-retaining cavity 50, the purpose of which will be hereinafter described. Additionally, wall 18 may be provided with openings 52, 52.

Figure 3:
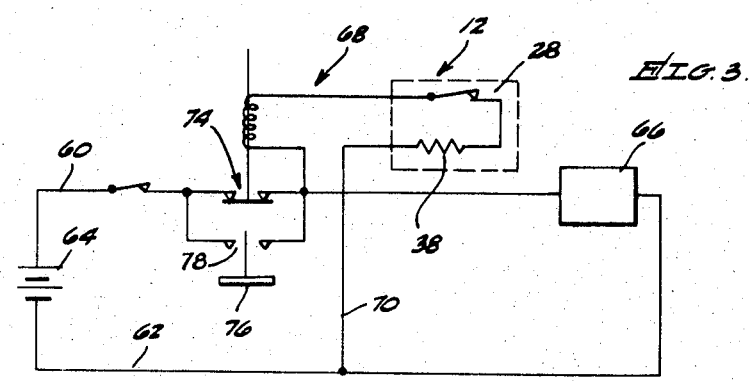
FIG. 3 is a schematic drawing of a typical electrical circuit in which the device of FIGS. 1 and 2 may be employed.

Directing attention to FIG. 3, it will be seen that a circuit is provided having a first lead 60 and second lead 62 emanating from a power source 64. The leads 60 and 62 may be connected to a load 66, for example, the klystron noted in the referenced patent application. A control circuit indicated generally at 68 is provided between main leads 60 and 62 and involves the first wire 70 in series with the heating element 38 of the device shown in FIG. 2, the latter being in series with the thermostat switch 28. The switch 28 is in turn in series with a normally open relay 74, the latter having contacts to open and close power to line 60 and thereby control power application to the load at 66. A momentary contact push button switch 76 is provided in a shunt circuit 78 shorting the normally open relay 74.

In normal operation the push button 76 is closed on its related contacts providing power to relay 74 and closing the latter across its contacts to thereby close the circuit to the load 66.

It will be recalled that the switching device of FIG. 2 is located within a liquid-containing chamber at approximately the normal level of the liquid within the chamber. Under these circumstances the liquid within the chamber is allowed to circulate via openings 48 and 52 into the cavity 50 and bathe the dielectric block 16 as well as the wire heating element 38 in the liquid. Thus, in normal operation, even though power is applied to contacts 34 and 36, the heat from the wire 38 is dissipated to the liquid and does not penetrate the block 16 to in any way affect the sensitive tip 32 of the temperature-sensing device 28.

In the event the liquid level within the chamber decreases to a point below the location of the device 12, as, for example, by external leakage, the heat created by the element 38 is not as rapidly dissipated to the non-liquid environment and it penetrates the block 16 to affect the tip 32 of the temperature-sensing element 28.

Referring to FIG. 3, the effect of heat applied by the wire heating element 38 would be to open the normally closed switch 72 which would interrupt power to the relay 28 causing it to bias to its normally open condition and interrupting the main power supply to load 66. Thus, in the event the liquid level falls below that required for design efficiency, the entire arrangement is shut down and cannot recycle "on" until manually reset with the push button 76.

Alternately, and in the event that the temperature of the liquid within the chamber rises unduly, for example, as a result of a substantial change in the surrounding atmospheric temperature, the liquid would no longer readily accept the heat provided by the wire heating element 38 and the heat would then penetrate the block 16 to energize the sensitive tip 32 of the temperature-sensing device 28. Again, the effect would be to interrupt power to the load as described above.

With reference to general operating temperature and other characteristics of the arrangement, attention is directed to FIG. 4.

In one constructed embodiment, a design characteristic of 5/10 watt per square inch was used and a normally closed thermostat 32 was provided to open at 140° Fahrenheit. The horizontal phantom line in FIG. 4 indicates the wattage input. In a Freon liquid under natural convection condition as shown on the graph with a saturated liquid at 130° F., it will be seen that the plot crosses the wattage input line at a delta F. degree change of 9° F. Under this condition the switching arrangement would actuate and open when the surrounding liquid reaches a temperature of 131° F. It is apparent then with a set temperature of 130° F. accurate temperature control resulted. Under this condition an arrangement as hereinafter described would indicate a switching temperature in the thermostat of 140°, i.e., 131° plus 9°.

If the ambient environment is in the gaseous natural convection state, for example, due to falling liquid level, it may be assumed that the surrounding vapor temperature would be 86° F. Note the wattage input line crosses the 86° F. saturated vapor line, a delta temperature differential of 250° F. results which would indicate a maximum temperature of 336° F. at the switching device. Similarly, if we assume a saturated vapor environment at 5° F., that line plot intersects the wattage input line at a delta degree F. of 620° or a device temperature of 625°. With the thermostat set to open at 140°, it is apparent that the arrangement is effective to open the control circuit under any possible condition occurring within the example chamber.

In one switching arrangement that has been actually reduced to practice, the body 16 was formed of a dielectric such as boron-nitride and had an outside dimension of 4/10" with a 2/10" diameter cavity 50 to receive the sensing element 32 of thermostat 28. The sensing element 32 was embedded in epoxy resin 30 in the cavity 50 to provide good thermal contact with the body 16. The heating element 38 comprised a 40-gauge wire having resistance of 84.69 ohms per foot, which, with a 15 volt applying circuit produced 2 watts of input power and 5/10 of a watt per square inch of heating the body surface. The body 16 was approximately ¼" long. The housing 20 which carried the entire arrangement was formed of Lexon plastic which provided good thermal insulation to the mounted chamber wall assuring that the device would only be affected by the environmental temperature within the chamber 50.

While certain materials and dimensions have herein been suggested for the specific example actually built, it will be apparent to those skilled in the art that other dielectric materials may be used both for the body 16 and housing 20, such as Bakelite. Additionally, it will be understood that while the thermostat 28 was described as a normally closed switching type, other temperature sensing elements may be used such as a thermistor. In any installation it is desirable to place the arrangement at the desired liquid level point assuring smooth flow of liquid through the openings 48 into intimate contact with the body 16, the openings 48 and the wall 46 desirably eliminating liquid surface perturbations in the arrangement. Additionally, should the overall installation employ a condenser such as that described in the referenced patent application, the installation point should be such that direct contact with the cool condensate drip from the condenser should be avoided and, in any event, the housing 20 be positioned so that the structure within the cavity 50 is completely separated from cool liquid coming directly from the condenser.

From the above description it will be apparent that an efficient control device has been described operating on the principle of heat transfer. The unit is small and may be constructed at a low initial cost. Further, it is easily installed in any appropriate location and requires little or no maintenance attention. It will provide accurate control of both liquid level within the chamber and the temperature thereof without being sensitive to variations in chamber attitude or variations in local magnetic fields that have heretofore been found to affect prior art control devices.

The invention as shown and described is by way of illustration and not limitation and may be modified in many particulars, all within the spirit and scope thereof.

What is claimed is:

1. A temperature detecting device adapted to be immersed in a fluid coolant, said device comprising:
    a cup-shaped dielectric insulating member having a centrally located cavity;
    means including a wire heating element, wound directly on the external surface of the walls of said cup-shaped dielectric insulating member, for providing a predetermined amount of heat;
    temperature sensing means, situated in said cavity, and concentrically oriented with respect to said wire heating element, for providing an indication that a predetermined environmental temperature has been exceeded; and
    means for securing said temperature sensing means in intimate thermal contact with said cup-shaped dielectric insulating member in said centrally located cavity thereof.

2. The apparatus defined by claim 1 further comprising first and second terminals operatively coupled to the respective ends of said wire heating element whereby said wire heating element is an electrically resistive unit which will provide a predetermined amount of heat upon the application of electrical current thereto through said first and second terminals.

References Cited

UNITED STATES PATENTS

| | | | |
|---|---|---|---|
| 3,489,976 | 1/1970 | Marcoux | 337—102 |
| 3,335,243 | 8/1967 | Canaday | 337—102 |
| 3,171,934 | 3/1965 | Brennan et al. | 337—380(X) |
| 3,140,370 | 7/1964 | Harper, Jr. | 337—112(X) |
| 2,573,483 | 10/1951 | Peters | 337—380 |

FOREIGN PATENTS

| | | | |
|---|---|---|---|
| 68,144 | 9/1920 | Sweden | 337—380 |

BERNARD A. GILHEANY, Primary Examiner

D. M. MORGAN, Assistant Examiner

U.S. Cl. X.R.

337—112